United States Patent

Uchiyama et al.

Patent Number: 5,124,074
Date of Patent: Jun. 23, 1992

[54] ANTI-FOAMING AGENT

[75] Inventors: Yoshitaka Uchiyama; Harumi Suzuki, both of Mie, Japan

[73] Assignee: Mitsubishi Petrochemical Co., Ltd., Tokyo, Japan

[21] Appl. No.: 702,509

[22] Filed: May 20, 1991

[30] Foreign Application Priority Data

May 25, 1990 [JP] Japan ................... 2-135790

[51] Int. Cl.$^5$ .............................................. B01D 19/04
[52] U.S. Cl. .................................... 252/358; 252/321; 568/623; 568/624; 568/622
[58] Field of Search ................. 252/358, 321; 568/623, 568/624, 622

[56] References Cited

U.S. PATENT DOCUMENTS

| | | | |
|---|---|---|---|
| 4,275,244 | 6/1981 | Helfert et al. | 568/624 |
| 4,287,078 | 9/1981 | Langdon et al. | 252/76 |
| 4,510,067 | 4/1985 | Ozmeral | 252/174.21 |
| 4,876,122 | 10/1989 | Hellsten | 428/34.1 |

Primary Examiner—Richard D. Lovering
Assistant Examiner—N. Bhat
Attorney, Agent, or Firm—Oblon, Spivak, McClelland, Maier & Neustadt

[57] ABSTRACT

A novel anti-foaming agent is described which contains a compound produced by an addition reaction of a mono-substituted poly(alkylene glycol) represented by the general formula:

$$RO(AO)_xH \qquad (I)$$

wherein R represents a monovalent hydrocarbon group having from 1 to 20 carbon atoms, AO represents a structural unit of an oxyalkylene chain, said structural unit having from 2 to 4 carbon atoms, and x represents a number of 1 to 80, with a polyepoxy compound represented by the general formula:

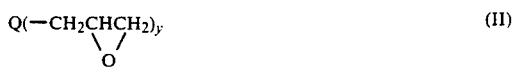

wherein Q represents a residue of an organic compound containing in the molecule thereof 2 or more hydroxyl groups and either of a hydrocarbon chain having from 2 to 20 carbon atoms and an oxyalkylene chain having a polymerization degree of from 2 to 100, said residue having a valence of y and being formed by removing from 2 to 8 active hydrogen atoms from the organic compound, and y represents a number of 2 to 8.

6 Claims, No Drawings

ANTI-FOAMING AGENT

FIELD OF THE INVENTION

The present invention relates to an anti-foaming agent. More particularly, it relates to a novel anti-foaming agent which is useful in eliminating various kinds of troubles caused by foaming in processes of a variety of industries handling surfactants, water-soluble high-molecular compounds, or the like.

BACKGROUND OF THE INVENTION

In processes of a variety of industries where surfactants, water-soluble high-molecular compounds, or the like are handled, such as, for example, the fiber industry, dyeing industry, paper and pulp industry, synthetic resin industry, and dye industry, various anti-foaming agents have been used in order to prevent various troubles caused by foaming.

Conventionally used anti-foaming agents, for example, include mineral oils, fats and oils, fatty acids, fatty acid esters, alcohols, silicones, poly(alkylene glycol)s, and mixtures thereof in arbitrary proportions.

These anti-foaming agents can exhibit their anti-foaming effect by being incorporated beforehand into substances that will cause foaming or by being directly added to liquids that are foaming. On the other hand, however, there have been not a few cases where the addition of anti-foaming agents itself causes a problem.

For example, because the known anti-foaming agents generally are insoluble or only slightly soluble in water, use of these may cause the following troubles. That is, in the case where products to which anti-foaming agents have been added are mixed with water to dissolve the products, the anti-foaming agents separate out and float on or in the resulting solutions or the solutions become cloudy due to emulsification. Further, in the field of coatings, adhesives, or the like, pinholes are formed and repelling occurs in coating or adhesive films or the like, and this may impair the adhesion of the films.

Anti-foaming agents of the silicone type, fatty acid ester type, and similar types undergo hydrolysis or other reactions in aqueous solutions with the lapse of time and are thus denatured, so that they not only lose their anti-foaming effect, but form scums and precipitates to cause fouling of the facilities and products.

Although poly(alkylene glycol)-type anti-foaming agents are relatively less apt to cause the above-described troubles, the anti-foaming effect of this type of anti-foaming agents is insufficient in itself.

For the purpose of overcoming these problems, several anti-foaming agents have been developed hitherto.

In JP-A-59-132908 (the term "JP-A" as used herein means an "unexamined published Japanese patent application") and JP-A-60-137405, for example, there are descriptions to the effect that polyoxyalkylene chain-containing compounds which are produced using monoepoxy compounds such as monoglycidyl ethers, as raw material, and have a terminal α-alkyl glyceryl ether group are useful as an anti-foaming agent for aqueous solutions containing water-soluble high-molecular compounds. However, since the terminal alkyl groups in these compounds have been directly glyceryl-etherified, there are problems that if the anti-foaming agents are added to aqueous solutions of water-soluble high-molecular compounds or the like in amounts that are necessary for the anti-foaming agents to sufficiently exhibit their anti-foaming effect, the clarity of the aqueous solutions is impaired, and that incorporation of these anti-foaming agents into coating compositions or adhesives may cause repelling or pinholes.

As described above, each of the conventionally known anti-foaming agents has both an advantage and a disadvantage, and there is no anti-foaming agent which is comprehensively satisfactory. Hence, development of an anti-foaming agent free of the above described problems has been desired.

The qualities particularly required of anti-foaming agents for water-soluble high-molecular compounds are to produce an excellent long-lasting anti-foaming effect when added even in a small amount and to uniformly dissolve in aqueous solutions of water-soluble high-molecular compounds so as not to impair the clarity of the solutions.

Any of the conventional anti-foaming agents does not possess both of the above qualities and, hence, development of an excellent anti-foaming agent satisfying all of these requirements has long been a subject for eliminating foaming troubles in various industries where water-soluble high-molecular compounds are handled.

SUMMARY OF THE INVENTION

The present inventors have conducted intensive studies in order to overcome the problems of the conventional anti-foaming agents. As a result, it has now been found that a compound obtained from a specific glycol derivative and a specific polyepoxy compound has a long-lasting excellent anti-foaming effect. The present invention has been completed based on this finding.

Accordingly, an object of the present invention is to provide a novel anti-foaming agent which is useful in eliminating the conventional troubles described above.

Other objects and effects of the present invention will be apparent from the following description.

The present invention provides an anti-foaming agent containing a compound produced by an addition reaction of a mono-substituted poly(alkylene glycol) represented by the general formula:

$$RO(AO)_xH \qquad (I)$$

wherein R represents a monovalent hydrocarbon group having from 1 to 20 carbon atoms, AO represents a structural unit of an oxyalkylene chain, the structural unit having from 2 to 4 carbon atoms, and x represents a number of 1 to 80, with a polyepoxy compound represented by the general formula:

$$Q(-CH_2CHCH_2)_y \atop \underset{O}{\diagdown \diagup} \qquad (II)$$

wherein Q represents a residue of an organic compound containing in the molecule thereof 2 or more hydroxyl groups and either of a hydrocarbon chain having from 2 to 20 carbon atoms and an oxyalkylene chain having a polymerization degree of from 2 to 100, the residue having a valence of y and being formed by removing from 2 to 8 active hydrogen atoms from the organic compound, and y represents a number of 2 to 8.

DETAILED DESCRIPTION OF THE INVENTION

Mono-substituted poly(alkylene glycol)

The mono-substituted poly(alkylene glycol), which is one of the raw materials used for producing the compound to be contained in the anti-foaming agent of the present invention, has a chemical structure represented by the above-described general formula (I).

In this general formula (I), R represents a monovalent hydrocarbon group having from 1 to 20 carbon atoms. Examples thereof include straight-chain or branched, primary or secondary alkyl and alkenyl groups having from 1 to 20 carbon atoms, phenyl group, mono- or di-substituted phenyl groups having from 7 to 20 carbon atoms, and the like.

Examples of the alkyl groups include methyl, ethyl, propyl, isopropyl, butyl, isobutyl, octyl, 2-ethylhexyl, isodecyl, dodecyl, tridecyl, tetradecyl, hexadecyl, and octadecyl groups. Examples of the alkenyl groups include octenyl, dodecenyl, and octadecenyl groups. Examples of the mono- or di-substituted phenyl groups include methylphenyl, ethylphenyl, propylphenyl, butylphenyl, octylphenyl, nonylphenyl, dodecylphenyl, tridecylphenyl, phenylphenyl, styrenated phenyl, diethylphenyl, and dibutylphenyl groups.

Preferred of these are straight-chain or branched, primary or secondary alkyl groups.

The structural unit of an oxyalkylene chain, which unit is represented by AO and has from 2 to 4 carbon atoms, is $-C_2H_4O-$, $-C_3H_6O-$, or $-C_4H_8O-$. The oxyalkylene chain may be made up of one kind alone of these groups or a mixture of two or more kinds of these groups in arbitrary proportions.

Specific examples of the mono-substituted poly(alkylene glycol) represented by general formula (I) include compounds formed by the addition of 1 to 80 moles of one alkylene oxide or a combination of two or more alkylene oxides selected from the group consisting of ethylene oxide, propylene oxide, and butylene oxide to 1 mole of a monohydric alcohol such as methanol, ethanol, n-propanol, isopropanol, butanol, isobutanol, n-octanol, 2-ethylhexanol, isodecanol, dodecyl alcohol, tridecyl alcohol, oleyl alcohol, coconut-oil alcohol, an alcohol synthesized by the oxo process and having from 4 to 18 carbon atoms, an alcohol synthesized by the paraffin oxidation process and having from 4 to 18 carbon atoms, or the like; and compounds formed by the addition of 1 to 80 moles of one alkylene oxide or a combination of two or more alkylene oxides selected from the group consisting of ethylene oxide, propylene oxide, and butylene oxide to 1 mole of a mono- or di-substituted phenol such as octylphenol, nonylphenol, dodecylphenol, tridecylphenol, p-phenylphenol, styrenated phenol, dibutylphenol, or the like. However, the mono-substituted poly(alkylene glycol) of general formula (I) is not limited to these examples.

Polyepoxy compound

The polyepoxy compound which is the other raw material has a chemical structure represented by general formula (II).

In this general formula (II), the moiety shown by Q is a residue of an organic compound containing in the molecule thereof 2 or more hydroxyl groups and either of a hydrocarbon chain having from 2 to 20 carbon atoms and an oxyalkylene chain having a polymerization degree of from 2 to 100, the residue being formed by removing from 2 to 8 active hydrogen atoms from the organic compound. Specific examples of the moiety of Q include residues of the following organic compounds, each residue being formed by removing 2 to 8 hydrogen atoms from the terminal OH groups in the chemical structure of the organic compound.

(1) Examples of organic compounds containing in the molecule thereof 2 hydroxyl groups and a hydrocarbon chain having from 2 to 20 carbon atoms include ethylene glycol, propylene glycol, tetramethylene glycol, hexanediol, neopentyl glycol, resorcin, adipic acid, and the like.

(2) Examples of organic compounds containing in the molecule thereof 3 or more hydroxyl groups and a hydrocarbon chain having from 2 to 20 carbon atoms include glycerol, trimethylolpropane, sorbitol, sorbitan, polyglycerol, pentaerythritol, and the like.

(3) Examples of organic compounds containing in the molecule thereof 2 hydroxyl groups and an oxyalkylene chain having a polymerization degree of from 2 to 100 include diethylene glycol, dipropylene glycol, poly(ethylene glycol), poly(propylene glycol), and the like.

(4) Examples of organic compounds containing in the molecule thereof 3 or more hydroxyl groups and an oxyalkylene chain having a polymerization degree of from 2 to 100 include an adduct of glycerol with ethylene oxide, an adduct of ethylenediamine with ethylene oxide, an adduct of sorbitol with ethylene oxide, an adduct of sorbitan with ethylene oxide, and the like.

Preferred examples of the polyepoxy compound represented by general formula (II) include those where Q represents $-O(C_nH_{2n})O-$, $-O(C_kH_{2k}O)_m-$, or $-O(C_pH_{2p})_q-$ $[CH_2CH(OH)CH_2O(C_pH_{2p}O)_q]_r-$ wherein n is a number of 1 to 12, k is a number of 2 or 3, m is a number of 2 to 100, p is a number of 2 to 4, q is a number of 1 to 100, and r is a number of 1 to 5, and y is 2.

Specific examples of the polyepoxy compound represented by general formula (II) in which y is 2 include ethylene glycol diglycidyl ether, propylene glycol diglycidyl ether, tetramethylene glycol diglycidyl ether, hexanediol diglycidyl ether, neopentyl glycol diglycidyl ether, resorcin diglycidyl ether, adipic acid diglycidyl ether, diethylene glycol diglycidyl ether, dipropylene glycol diglycidyl ether, poly(ethylene glycol) diglycidyl ether, poly(propylene glycol) diglycidyl ether, and the like. Specific examples of the polyepoxy compound of general formula (II) in which y is 3 to 8 include glycerol triglycidyl ether, trimethylolpropane triglycidyl ether, sorbitol polyglycidyl ether, sorbitan polyglycidyl ether, polyglycerol polyglycidyl ether, pentaerythritol polyglycidyl ether, polyglycidyl ether of an ethylene oxide adduct of glycerol, polyglycidyl ether of an ethylene oxide adduct of ethylenediamine, polyglycidyl ether of an ethylene oxide adduct of sorbitol, polyglycidyl ether of an ethylene oxide adduct of sorbitan, and the like. The compound of general formula (II) is not limited to these examples.

Product of addition reaction

The compound to be contained in the anti-foaming agent of the present invention may, for example, be produced by the following method. A mono-substituted poly(alkylene glycol) represented by the general formula:

$$RO(AO)_xH \quad (I)$$

is introduced into a reactor and a reaction catalyst, such as an acid, alkali, or the like, is added thereto. In a nitrogen atmosphere, a polyepoxy compound represented by the general formula:

$$Q(-CH_2\underset{\underset{O}{\diagdown\diagup}}{CH}CH_2)_y \quad (II)$$

is introduced into the reactor and reacted with the mono-substituted poly(alkylene glycol) at a temperature of 50° to 180° C. for 1 to 10 hours, thereby to synthesize the desired compound.

This reaction may yield the following compounds;

(a) a compound which is formed by the ring opening of the epoxy groups of the polyepoxy compound by the action of the terminal active hydrogen atom of the mono-substituted poly(alkylene glycol) and the addition of the mono-substituted poly(alkylene glycol) to the polyepoxy compound, and which has a structure represented by the following general formula:

$$Q[-CH_2\underset{\underset{OH}{|}}{CH}CH_2(AO)_xOR]_y \quad (III)$$

(b) a compound formed by the addition of the mono-substituted poly(alkylene glycol) to part of the epoxy groups of the polyepoxy compound and represented by the following general formula:

$$Q\begin{matrix}[-CH_2\underset{\underset{OH}{|}}{CH}CH_2(AO)_xOR]_z \\ \\ (-CH_2\underset{\underset{O}{\diagdown\diagup}}{CH}CH_2)_{y-z}\end{matrix} \quad (IV)$$

wherein z is a number of 1 to 7, provided that y>z, (c) a compound formed by the reaction of an epoxy group of the raw material polyepoxy compound of general formula (II) with a secondary OH group of the compound of general formula (III) or (IV) above and formation of intermolecular or intramolecular crosslinking, and a compound formed by the reaction of an epoxy group of the raw material polyepoxy compound of general formula (II) or an epoxy group of the intermediate of general formula (IV) with a secondary OH group formed by the above crosslinking and by the ring opening of the epoxy group and addition of the compound of general formula (II) or (IV) to the above crosslinked compound, and (d) a compound formed by the reaction of an epoxy group of the compound of general formula (IV) with a secondary OH group of the compound of general formula (III) or (IV) above, and a compound formed by the reaction of an epoxy group of the raw material polyepoxy compound of general formula (II) or an epoxy group of the intermediate of general formula (IV) with a secondary OH group formed by the above reaction and by the ring opening of the epoxy group and addition of the compound of general formula (II) or (IV) to the secondary OH group-containing compound. Although these compounds may be yielded by the above reaction, it is difficult to specify the structures of these compounds as a whole.

The raw materials remaining unreacted and the catalyst which have come into the reaction product may be separated and removed by distillation, adsorption treatment, or other means.

It is desirable that the amount of the raw material polyepoxy compound introduced into the reactor be slightly larger than stoichiometric equivalent to the mono-substituted poly(alkylene glycol) so as to reduce as much as possible the amount of the mono-substituted poly(alkylene glycol) remaining unreacted after the reaction. In the case where a slight amount of epoxy rings remain in the product, the epoxy rings may be left as they are or may be allowed to undergo ring opening and addition by incorporating water or a water-soluble compound having an active hydrogen, such as ethanol or poly(ethylene glycol), into the product.

Anti-foaming agent

The anti-foaming agent of the present invention can be used for the purpose of foaming prevention in various processes of industries handling surfactants and water-soluble high-molecular compounds, such as the fiber-dyeing industry, paper and pulp industry, synthetic resin industry, and coating and adhesive industry.

The anti-foaming agent of the present invention may be added beforehand to substances that will cause foaming, such as surfactants and water-soluble high-molecular compounds. Alternatively, it may be added directly to aqueous solutions containing these foaming substances.

The anti-foaming agent of the present invention may be used after being diluted beforehand to a proper concentration with water, an organic solvent, or the like, or after being blended with a conventionally known anti-foaming agent in an arbitrary proportion.

The amount of the anti-foaming agent of this invention used varies depending on processes to which the anti-foaming agent is applied. Although the amount of the anti-foaming agent to be used cannot therefore be specified unconditionally, sufficient effects are generally produced when the anti-foaming agent is used in an amount of from 0.0001 to 3% by weight in terms of the amount of an active ingredient based on the amount of a foaming substance, such as a surfactant or a water-soluble high-molecular compound, or an aqueous solution thereof.

The anti-foaming agent of the present invention has the following excellent effects.

(A) It has an exceedingly good anti-foaming effect as compared with ordinary anti-foaming agents of the poly(alkylene glycol) type or silicone type, and shows its anti-foaming effect over a wide temperature range of from ordinary temperature to around 100° C.

(B) It is less apt to be affected by pH and is stable in both acid and alkaline solutions, so that the anti-foaming effect lasts over a prolonged period of time.

(C) Because of its good affinity for water, the anti-foaming agent can be uniformly dissolved or dispersed in aqueous solutions containing foaming substances, so that such problems as dyeing unevenness, pinholes, and repelling, which often cause troubles in the dyeing industry, coating and adhesive industry, synthetic resin industry, and other industrial fields, can be eliminated.

(D) It has so good affinity for water-soluble high-molecular compounds that it never impairs the clarity of aqueous coating or adhesive solutions required to be clear, such as clear coatings and poly(vinyl alcohol) sizing agents.

The present invention will be explained below in more detail with reference to the following Production Examples for the anti-foaming agent of the invention and Examples and Comparative Examples, but these examples should not be construed to be limiting the scope of the invention.

PRODUCTION EXAMPLE 1

Into a 2,000-ml reactor flask were introduced 761.4 g of an ethylene oxide-15 mol-adduct (molecular weight, 846) of lauryl alcohol and 5.6 g of potassium hydroxide as a catalyst. Stripping was then conducted by bubbling nitrogen gas at 110° C. for 2 hours to increase the water content to 100 ppm or less.

Subsequently, while the contents in the flask were kept being stirred at a constant temperature of 110° C., 172 g of an epoxy compound (epoxy equivalent, 172) consisting mainly of dipropylene glycol diglycidyl ether having the structure:

$$CH_2CHCH_2O(C_3H_6O)_2CH_2CHCH_2$$
$$\diagdown\diagup \quad\quad\quad\quad\quad\quad\quad \diagdown\diagup$$
$$O \quad\quad\quad\quad\quad\quad\quad\quad\quad\quad O$$

was gradually introduced into the flask and allowed to react with the adduct for 5 hours. Thereafter, 6.2 g of ethylene glycol (molecular weight, 62) was added and reaction was conducted for another 2 hours under the same conditions.

After the reaction, 50 g of activated clay was added and adsorption treatment was conducted for 30 minutes to remove the catalyst, thereby obtaining 896 g of a product. This product was a yellow viscous liquid. (Compound 1)

PRODUCTION EXAMPLE 2

In the same manner as in Production Example 1, 400 g of a methoxypoly(ethylene glycol) (molecular weight, 400) was reacted with 192 g of a polyglycidyl ether (epoxy equivalent, 192) of an ethylene oxide adduct of glycerol. The reaction mixture was then subjected to activated clay treatment, thereby obtaining 581 g of a product. This product was a yellow viscous liquid. (Compound 2)

PRODUCTION EXAMPLE 3

Into a 1,000-ml reactor flask, 300 g of a propylene oxide-25 mol-and-ethylene oxide-33 mol-adduct (molecular weight, 3,000) of butanol was introduced which adduct had the structure: $C_4H_9(C_3H_6O)_{25}(C_2H_4O)_{33}H$. Stripping was then conducted by bubbling nitrogen gas at 110° C. for 2 hours to decrease the water content to 100 ppm or less.

Thereto was added 0.71 g of a $BF_3$-ether complex (molecular weight, 142) as a catalyst. While the contents in the flask were kept being stirred at 110° C. in a nitrogen stream, 15.4 g of an epoxy compound (epoxy equivalent, 140) consisting mainly of neopentyl glycol glycidyl ether having the structure:

$$\quad\quad\quad\quad\quad\quad CH_3$$
$$\quad\quad\quad\quad\quad\quad |$$
$$CH_2CHCH_2OCH_2CCH_2OCH_2CHCH_2$$
$$\diagdown\diagup \quad\quad\quad\quad | \quad\quad\quad\quad \diagdown\diagup$$
$$O \quad\quad\quad\quad CH_3 \quad\quad\quad\quad O$$

was added gradually and reacted with the adduct for 3 hours.

Thereafter, the reaction mixture was cooled to 90° C., and 7 g of a fine powder of a hydrotalcite was added. Adsorption treatment was conducted for 30 minutes and the resulting mixture was filtered to remove the catalyst.

Thus, 304 g of a product was obtained, which was a pale yellow liquid. (Compound 3)

PRODUCTION EXAMPLE 4

In the same manner as in Production Example 3, 39.5 g of a propylene oxide-3 mol-adduct (molecular weight, 395) of an oxo-process alcohol (Dobanol 45, manufactured by Mitsubishi Petrochemical Cp., Ltd., Japan and having an average carbon number of 14.5) was reacted with 28.8 g of an epoxy compound (epoxy equivalent, 262) consisting mainly of a poly(ethylene glycol) diglycidyl ether having the following structure.

$$CH_2CHCH_2O(C_2H_4O)_9CH_2CHCH_2$$
$$\diagdown\diagup \quad\quad\quad\quad\quad\quad\quad \diagdown\diagup$$
$$O \quad\quad\quad\quad\quad\quad\quad\quad\quad\quad O$$

Thereafter, adsorption treatment was conducted, obtaining 61 g of a product.

This product was a pale yellow and transparent liquid. (Compound 4)

PRODUCTION EXAMPLE 5

In the same manner as in Production Example 3, 616 g of an ethylene oxide-9 mol-adduct (molecular weight, 616) of nonylphenol was reacted with 14.5 g of a trimethylolpropane polyglycidyl ether (epoxy equivalent, 145). Thereafter, adsorption treatment was conducted, obtaining 71 g of a product.

This product was a pale yellow and transparent liquid. (Compound 5)

PRODUCTION EXAMPLE 6

In the same manner as in Production Example 3, 102.2 g of a propylene oxide-4 mol-and-ethylene oxide-15 mol-adduct (molecular weight, 1,022) of 2-ethylhexanol was reacted with 23.1 g of a pentaerythritol polyglycidyl ether (epoxy equivalent, 231). Thereafter, adsorption treatment was conducted, obtaining 118 g of a product.

This product was a pale yellow and transparent liquid. (Compound 6)

PRODUCTION EXAMPLE 7

In the same manner as in Production Example 3, 39.4 g of an ethylene oxide-6 mol-adduct (molecular weight, 394) of 2-ethylhexanol was reacted with 12.3 g of ethylene glycol diglycidyl ether (epoxy equivalent, 112). Thereafter, adsorption treatment was conducted, obtaining 44 g of a product.

This product was a pale yellow and transparent liquid. (Compound 7)

EXAMPLES 1 TO 7 AND COMPARATIVE EXAMPLES 1 TO 3

The anti-foaming agent compounds according to the invention which had been produced in Production Examples 1 to 7 were evaluated by the methods given below, along with the following conventionally known antifoamer A to C on the market.

Antifoamer A

Poly(alkylene glycol)-type anti-foaming agent containing an ethylene oxide-propylene oxide copolymer as a major component.

Antifoamer B

Silicone-type anti-foaming agent containing polydimethylsiloxane.

Antifoamer C

α-Alkyl glyceryl ether-type anti-foaming agent synthesized from an ethylene oxide-and-propylene oxide-adduct of butanol and 2-ethylhexyl glycidyl ether as a monoepoxy compound.

Each anti-foaming agent was added, in an amount of 0.006% by weight, to a foaming solution which was a 4-wt % aqueous solution of poly(vinyl alcohol) (Unichika Poval UP-180) as a water-soluble polymer (PVA solution). Using the thus-prepared test solutions, anti-foaming effect and clarity of the PVA solution were evaluated by the following methods.

Anti-foaming effect

Each test solution was placed in an amount of 400 ml in a vertically installed glass cylinder (inner diameter 45 mm, height 660 mm; equipped with a warming jacket; connected at its bottom to a circulating pump). While the temperature of the test solution was kept at 60° C., the solution was withdrawn from the bottom of the cylinder at a rate of 2.0 l/min and allowed to fall into the test solution remaining in the cylinder from a height of 50 cm as measured from the surface of the test solution in the cylinder. Thus, the test solution was circulated so as to foam.

After 10-minute circulation, foaming inhibition was evaluated by measuring the height (cm) of the resulting foam. Thereafter, circulation was stopped and foam-breaking properties were evaluated by measuring the height (cm) of the foam after the cylinder was allowed to stand for 2 minutes.

Clarity of PVA solution

Each test solution was placed in a 10-mm glass cell, and the transmission (%) for a visible light having a wavelength of 430 nm was measured by means of a spectrophotometer, with distilled water being used as a control.

The results of the above evaluations are summarized in Table 1.

TABLE 1

| Sample | | Anti-foaming effect | | Clarity of PVA solution (%) |
|---|---|---|---|---|
| | | Foaming inhibition | Foam-breaking property | |
| Example 1 | Compound 1 | 13.0 | 0.5 | 98.7 |
| Example 2 | Compound 2 | 16.0 | 2.5 | 99.0 |
| Example 3 | Compound 3 | 12.5 | 1.0 | 98.8 |
| Example 4 | Compound 4 | 13.0 | 0.5 | 97.6 |
| Example 5 | Compound 5 | 14.0 | 2.0 | 96.3 |
| Example 6 | Compound 6 | 12.5 | 0.3 | 95.5 |
| Example 7 | Compound 7 | 13.5 | 0 | 99.3 |
| Comp. Example 1 | Antifoamer A | 25.0 | 21.5 | 99.4 |
| Comp. Example 2 | Antifoamer B | 19.5 | 3.0 | 65.1 |
| Comp. Example 3 | Antifoamer C | 15.5 | 2.0 | 68.6 |

TABLE 1-continued

| Sample | Anti-foaming effect | | Clarity of PVA solution (%) |
|---|---|---|---|
| | Foaming inhibition | Foam-breaking property | |
| Blank | 41.5 | 39.5 | 99.5 |

While the invention has been described in detail and with reference to specific embodiments thereof, it will be apparent to one skilled in the art that various changes and modifications can be made therein without departing from the spirit and scope thereof.

What is claimed is:

1. An anti-foaming agent containing a compound produced by an addition reaction of a mono-substituted poly(alkylene glycol) represented by the general formula:

$$RO(AO)_xH \qquad (I)$$

wherein R represents a monovalent hydrocarbon group having from 1 to 20 carbon atoms, AO represents a structural unit of an oxyalkylene chain, said structural unit having from 2 to 4 carbon atoms, and x represents a number of 1 to 80, with a polyepoxy compound represented by the general formula:

$$Q(-CH_2\overset{\diagdown}{C}H\overset{\diagup}{C}H_2)_y \qquad (II)$$

wherein Q represents a residue of an organic compound containing in the molecule thereof 2 or more hydroxyl groups and either of a hydrocarbon chain having from 2 to 20 carbon atoms and an oxyalkylene chain having a polymerization degree of from 2 to 100, said residue having a valence of y and being formed by removing from 2 to 8 active hydrogen atoms from the organic compound, and y represents a number of 2 to 8.

2. An anti-foaming agent as claimed in claim 1, wherein in general formula (II), Q is selected from the group consisting of $$-O(C_nH_{2n})O-,$$

$$-O(C_kH_{2k}O)_m-, \text{ and}$$

$$-O(C_pH_{2p})_q-[CH_2CH(OH)CH_2O(C_pH_{2p}O)_q]_r-$$

n is a number of 1 to 12, k is a number of 2 or 3, m is a number of 2 to 100, p is a number of 2 to 4, q is a number of 1 to 100, and r is a number of 1 to 5, and y is 2.

3. An anti-foaming agent as claimed in claim 1, wherein, R is selected from the group consisting of straight-chain or branched, primary or secondary alkyl and alkenyl groups having from 1 to 20 carbon atoms, phenyl group, and mono- or di-substituted phenyl groups having from 7 to 20 carbon atoms.

4. An anti-foaming agent as claimed in claim 3, wherein, R is selected from the group consisting of straight-chain or branched, primary or secondary alkyl groups.

5. An anti-foaming agent as claimed in claim 1, wherein OA is selected from the group consisting of $-C_2H_4O-$, $-C_3H_6O-$, and $-C_4H_8O-$.

6. An anti-foaming agent as claimed in claim 1, wherein the amount of the polyepoxy compound is slightly larger than stoichiometric equivalent to the mono-substituted poly(alkylene glycol).

* * * * *